United States Patent [19]

Mosburger

[11] 3,948,718
[45] Apr. 6, 1976

[54] APPARATUS FOR PRESSING A MOVING WEB OF MATERIAL AGAINST A SUPPORTING SURFACE PARTICULARLY TO A HEATING PART

[75] Inventor: Hans Mosburger, Weiherhammer, Germany

[73] Assignee: BHS-Bayerische Berg-Hutten-und Salzwerke Aktiengesellschaft, Munich, Germany

[22] Filed: Feb. 28, 1974

[21] Appl. No.: 446,718

[30] Foreign Application Priority Data
Mar. 2, 1973 Germany............................ 2310613

[52] U.S. Cl. ............ 156/543; 100/93 RP; 100/153; 156/548; 156/582; 156/551; 156/583
[51] Int. Cl.² ........................................ B32B 31/04
[58] Field of Search ........... 156/543, 538, 555, 548, 156/582, 580, 583, 358, 499, 359, 210, 470, 551; 93/1 H, 1 WZ; 100/93 RP, 151, 153, 118, 154, 119, 152, 120; 144/281 B; 162/205, 305, 206; 425/364, 372, 371, 373; 74/37

[56] References Cited
UNITED STATES PATENTS

| | | |
|---|---|---|
| 2,941,573 | 6/1960 | Cassady ............................... 156/60 |
| 3,223,027 | 12/1965 | Soda et al. ...................... 100/93 RP |
| 3,472,158 | 10/1969 | Shields............................... 100/154 |
| 3,607,523 | 9/1971 | McGirr............................... 156/210 |
| 3,676,268 | 7/1972 | Brandenburg ...................... 156/548 |
| 3,753,838 | 8/1973 | Brandenburg ...................... 156/583 |
| 3,829,338 | 8/1974 | Hayasi et al. ...................... 156/583 |

Primary Examiner—William A. Powell
Assistant Examiner—J. J. Gallagher
Attorney, Agent, or Firm—Silverman & Cass, Ltd.

[57] ABSTRACT

The invention relates to apparatus for pressing a moving web of material against a supporting surface, specially to press a web of corrugated cardboard against a heating part in a corrugated cardboard production system, comprising a stationary supporting surface over which the web of material is moved, also comprising press members acting in operating position via a press surface upon the web of material and adjustment means which transfer the press members from the operative position into an inoperative position and vice versa.

10 Claims, 7 Drawing Figures

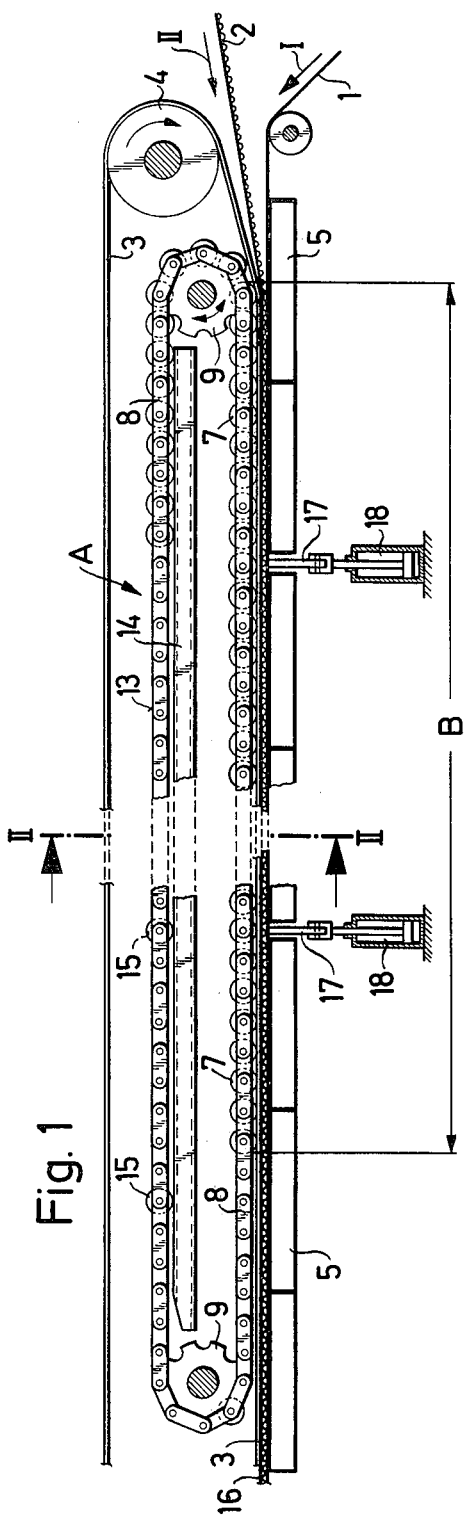
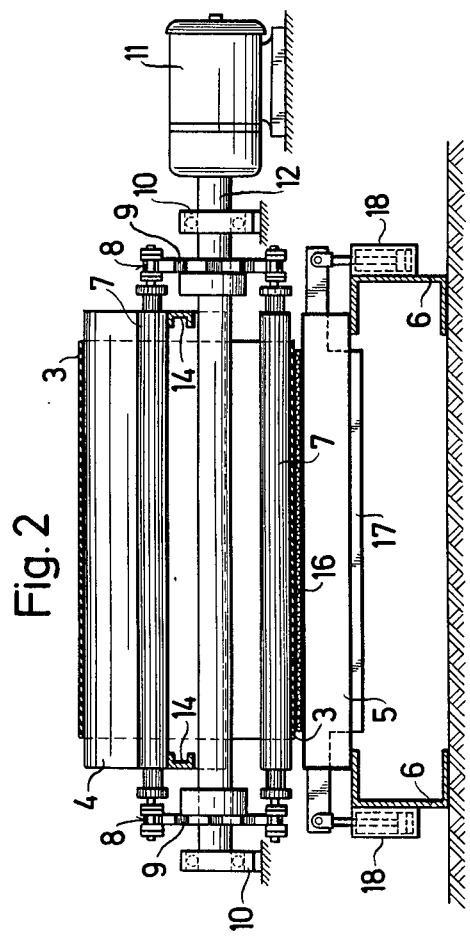

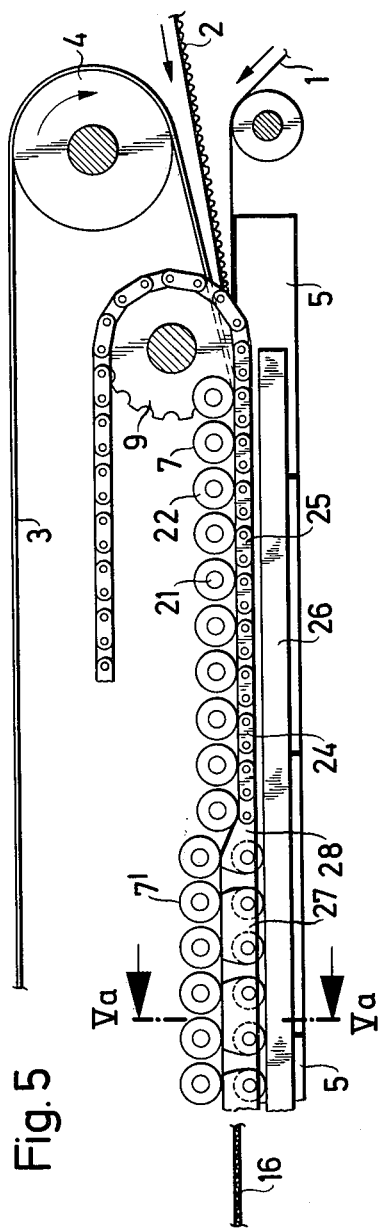
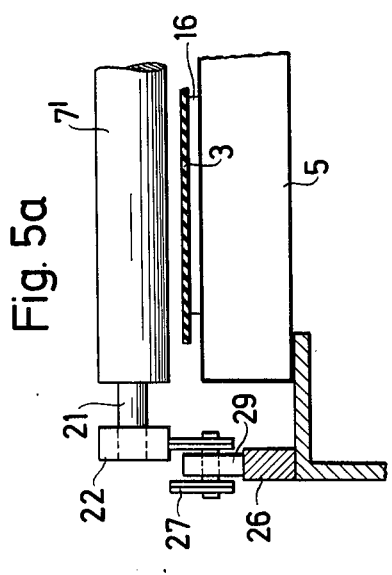

APPARATUS FOR PRESSING A MOVING WEB OF MATERIAL AGAINST A SUPPORTING SURFACE PARTICULARLY TO A HEATING PART

An apparatus for pressing a moving web of material against a supporting surface, specifically to press a web of corrugated cardboard against a heating part in a corrugated cardboard production system.

The German Offenlegungsschrift No. 1,912,085 describes a heating portion of a corrugated cardboard installation over which the web of corrugated cardboard is guided in pressed position. Vertically movable rollers are used as press members. Each nth roller is lifted off as a function of the heat to be transferred to the web of corrugated cardboard.

It is a disadvantage, in this respect, that the means for lifting off the individual rollers demand a considerable technical expenditure and that very many individual lifting members are necessary. In addition, the total mass of the roller must be lifted and carried, which necessitates an unnecessarily high expenditure in energy.

It is prior art moreover according to the German Offenlegungsschrift No. 2,058,277 to place the charging rollers as tightly as possible to each other in the area of the heating portion of a corrugated cardboard production system.

The invention deals with the problem of how to create an apparatus for pressing a moving web of material, particularly pressing a weg of corrugated cardboard against a heating part in a corrugated cardboard production system which is of simpler design, operates at a lower power consumption and allows for an infinitely variable change of the effective charge surface.

This problem is solved according to the invention in that the press members, starting from one end of the press surface can be transferred into their starting position successively, so that the press surface always forms a self-contained area whose magnitude is commensurate with the desired pressure and that the press members either are displaceable parallel to the web of material and movable vertically at a predetermined location by the adjustment apparatus, or that the press members are positioned vertically adjustable, and that the adjustment apparatus includes a lifting and supporting member displaceable parallel to the web of material.

With press members in the form of rollers extending transversely to the web of material the rollers may be placed, according to one embodiment of the invention, at one section of an endless conveyor which extends over the length of the supporting surface.

To relieve the apparatus of the rollers which are not in operative position, the section of the endless conveyor facing away from the supporting surface extends over a support of the rollers, according to another embodiment of the invention.

To obtain a defined heating effect, which makes possible a dependable gluing of the cardboard webs, the reversing wheels for the endless conveyor facing the infeed of the web of material are propelled, to reduce the press surface, opposite to the moving direction of the material web and vice versa, according to a further embodiment of the invention. This asssures that the lifting of the individual rollers and their moving at a heating portion of a cardboard installation takes place at the input end of the web of material.

For a fully automatic, simple control of the charge surface, the drive of one set of reversing wheels is applied as a function of the desired heat transfer to the web of material and in consideration of factors of the web of material. Preferably, the load surface is controlled automatically in relation to the speed of web material.

Preferably, the endless conveyor for the rollers includes chains extending over chain wheels.

According to another embodiment of the invention, the rollers also may be guided in guide rails. The displacement of the rollers is accomplished by action upon the first and/or the last roller.

Still according to another embodiment of the invention the rollers are connected with each other and at least one end of the roller cover is engaged by a regulatory displacement drive.

According to another embodiment of the invention, an articulated chain extending over a plane supporting surface and comprising sections of differential height which telescope into each other over a ramp is used as a lifting and supporting member displaceable parallel with the web of material and guided over chain wheels. By shifting this articulated chain the rollers following each other are lifted one after the other and transferred from their operative into their inoperative position. Here too, the shifting to reduce the charge surface takes place at one heating part toward the feed end of the material web and vice versa.

Below, the invention is described more in detail by means of embodiments exemplified in the drawing. In the drawing, FIG. 1 shows a schematic lateral view of the heating part of a corrugated cardboard installation;

FIG. 2 shows a section along line II—II;

FIG. 5 shows a partial view of a further embodiment, and

FIG. 5a shows a section along line Va—Va in FIG. 5.

Figure 3:
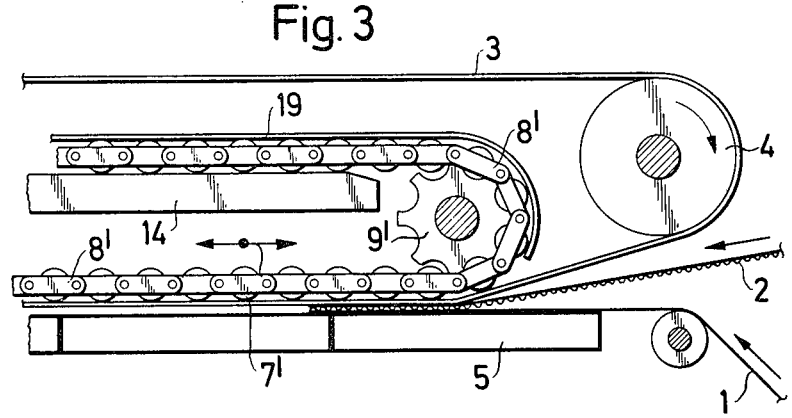
FIG. 3 shows a partial lateral view of a modified embodiment.

The invention is described in an exemplified manner only with regard to a heating part of an undulated cardboard installation. It is not restricted thereby to this possibility of application.

As usual, the heating part A of a corrugated cardboard system is supplied with a cover web 1 and a one-sided web 2, at whose wave crests glue already has been applied. The feeding device is identified by arrows I and II.

The webs 1 and 2 are pulled in via an endless conveyor belt 3 which extends on the input side via a belt drum 4. Either this drum or the other belt drum, which is not shown is propelled.

The converging webs 1, 2 are guided over heating plates 5 mounted on stationary supports 6. Press members in the form of rollers 7 press the webs 1, 2 against each other and against the heating plates 5 via the conveyor belt 3. The rollers 7 being in operative and thus pressing position thereby determine the press surface B. The number of operative rollers 7 and the size of the press area B will determine the amount of heat which must be transferred for the glueing and subsequent drying process from the heating plates 5 to the webs 1, 2. This amount depends on the quality of the paper, the type of cardboard, for example, single, double or triple glueing, speed of the webs and moisture contents of the webs. To achieve a maximum firmness of the glueing and an approximately constant residual humidity, yet avoiding any warping of the finished cardboard, it is necessary for the quantity of heat supplied to webs 1, 2 to correspond with the actually required amount of heat.

The adjustment of the quantity of heat supplied to the webs 1, 2 as a function of said factors is accomplished by extending or shortening of the press surface B.

To lengthen or shorten this press surface B, rollers 7 are transferred from their compressing operative position into an inoperative position. To that end, the rollers 7 are connected at their ends to chains 8. The chains 8 extend over chain wheels 9, whose shafts are positioned bilaterally in bearings 10. One of the shafts of the chain wheels 9, preferably the one associated with the input of the webs 1, 2, is propelled by an adjustment motor 11 via an adjustment shaft 12. The rollers 7 transferred into their inoperative position of the upper chain section are guided over longitudinally extending supports 14 on which the rollers 7 repose. That way the upper chain section 13 is relieved weight-wise.

According to FIG. 1, the press surface B is reduced when the pair of chain wheels 9 associated with the input of webs 1, 2 is propelled counterclockwise into the heating portion A. The press surface B is enlarged again when the drive is operated in the opposite direction.

When the system is shut down, all rollers are moved into their inoperative position, and supported there by the supports 14. So that the belt 3 remains guided, individual rollers 15 may be provided at the upper chain section 13.

To accomplish an optimal accessibility to the heating plates 5, the cardboard or corrugated cardboard web 16 may be lifted along with the belt 3 by swords 17. The swords 17 are operated jointly or individually via operating cylinders 18. The individual operation of the swords 17 improves access to the individual heating plates 5 for cleaning purposes. The cylinders may be designed for a lowlifting capacity because merely the belt 3 and the weight of the corrugated cardboard web 16 are to be lifted.

The positioning of the rollers 7 in the chains 8 allows for a vertical adjustability for example about 13mm (about ½ inch) of the roller cover formed in the required area, so that it automatically adjusts to the prevailing height of the corrugated cardboard. The height of the corrugated cardboard thus may be disregarded as a factor in the automatic adjustment of the rollers 7.

The roller shafts may be positioned in the chains 8 both in the articulations of the chain links and between the links. By connecting the rollers via chain 8 an extremely quiet run of the rollers 7 is accomplished which has extremely favorable results as to the quality of the corrugated cardboard. The high attenuation of the chains 8 safely avoids a jumping of the rollers 7 and thus a hammering together of the shaft in the corrugated cardboard.

The same system of rollers also could be in a modified form in the traction part usually following the heating portion of a corrugated cardboard installation.

In a modified embodiment according to FIG. 3 a finite chain 8' is used instead of an infinite chain for the positioning of the rollers. To guide the chains 8' about the propelled chain wheel 9' guide rails 19 are provided. In their inoperative position the rollers 7 are supported by beams 14. The guide rails 19 also may extend from the chain wheels 9' over these beams 14. This avoids the possibility of an unintentional lifting of the rollers 7 from the beams 14.

Figure 4:
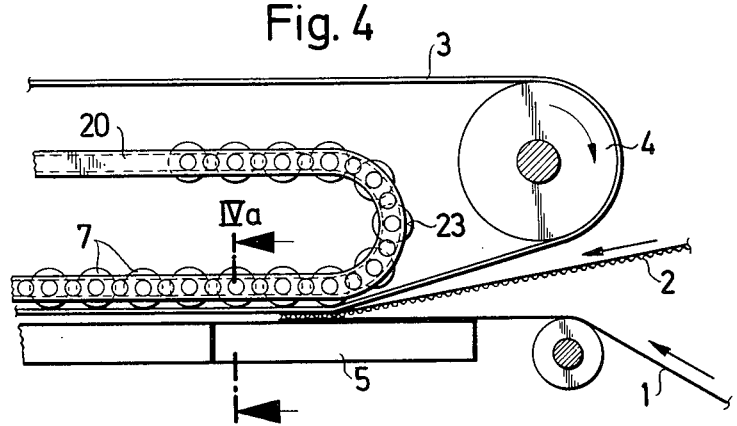
FIG. 4 shows a partial view of another embodiment.
Figure 4A:
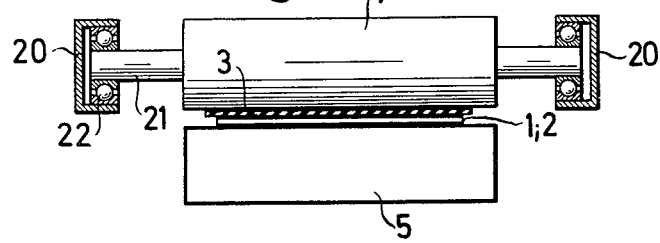
FIG. 4a shows a section along line IV–IVa of FIG. 4.

As can be seen from FIGS. 4 and 4a, the chains for the rollers 7 may be eliminated. They are replaced by U-shaped guide rails 20 located on both sides of the rollers 7; the course of these rails corresponding with that of the former endless chains. The roller shafts 21 are provided at their ends with bearing rollers or the like 22 extending in guide rails 20. The bearing rollers 22 preferably also determine the distances between the rollers 7. Preferably they are so dimensioned that there will be no contact between the rollers 7, but that they are placed as closely as possible next to each other.

The displacement of the rollers 7 forming a kind of cover, which are not connected to each other, may be accomplished for example in such a manner that the roller last in the operating direction of the corrugated cardboard web 16 is displaced for reducing the press surface opposite to the direction of movement of the corrugated cardboard web. This roller thereby pushes the rollers 2 lying ahead of it. The opposite direction of displacement is caused when the press surface B is increased. So that the rollers 7 placed therebehind will follow positively, guide rails following the terminal curvature 23 are designed extending obliquely upwardly. Thus, the trailing rollers can follow under the influence of their weight the leading roller shifting in the direction for the enlargement of the press surface B. It also would be possible to connect the first and last rollers with an endless rope or the like and to propel the latter. The upper section of the guide rail 20 then could extend horizontally.

In another embodiment according to FIGS. 5 and 5a, the rollers 7 are arranged vertically adjustable over the entire stretch of the maximum press surface. They are influenced vertically by chains 24 extending on both sides of the rollers. The chains 24 again move via chain wheels 9 and preferably form endless chains. The chain 24 bears down in the area of the press surface on guide rails 26. There, one chain section 25 is of such a height that the charge rollers 7 are in their compressing position. The roller shafts 21 adhere freely with bearing rollers 22 on the top side of the chain 24. The roller shafts 21 may be positioned vertically adjustable in guide bars, not shown. A chain section 27 is connected to the chain section 25, the height of the former being so dimensioned that the rollers 7' are transferred into their inoperative position. The transfer from chain section 25 to chain section 27 is accomplished by a wedge-shaped connecting member 28; rollers 7 are moved successively from their load position into their inoperative position or vice versa by moving the chains 24 in one direction or in the opposite one. The return movement of the individual rollers is accomplished under the influence of their weight. To reduce the friction of the chain 24 against the guide rail 26, rollers 29 are provided preferably in the area of the chain section 27 at the bottom side. The drive of the chains 24 causing the displacement of the rollers is accomplished via an adjustment motor, similar to FIG. 2. The chains also may have finite lengths. Then the drive would have to be designed accordingly.

It also is possible to use instead of rollers as press members other profile bodies, for example spheres and ball-shaped bodies. A surface-like member in the form of a carpet also could be used as a press member. However, in that case, preferably additional members for reducing the friction would have to be applied. Such a carpet could be guided endlessly; it could have a finite length and be coiled to change the press surface.

What I claim is:

1. An apparatus for pressing a moving web of material, specifically a web of corrugated cardboard, against a stationary supporting surface structured as a heating part, comprising successively arranged press members acting upon the web of material, which according to the desired degree of pressing can be transferred by adjustment means from an inoperative position into an operative position thereby increasing the press surface, wherein the successive press members and adjustment means supporting the latter are displaceable parallel to the conveying direction of the web of material, their number being increasable in operative position for extending the press surface and decreasable for reducing said press surface.

2. An apparatus according to claim 1 including press members in the form of rollers extending transversely to the web of material, characterized by the fact that the rollers are placed at one section of an endless conveyor which extends over the length of the supporting surface.

3. An apparatus according to claim 2 characterized by the fact that the section of the conveyor facing away from the supporting surface extends over a support for the rollers.

4. An apparatus according to claims 1 characterized by the fact that the reversing wheels facing the input of the web of material are, to reduce the press surface, propelled opposite to the moving direction of the web of material, and vice versa.

5. An apparatus according to claim 4 characterized by the fact that the drive of one set of reversing wheels is applied as a function of the desired heat transfer to the web of material and in consideration of factors of the web of material.

6. An apparatus according to claim 5 characterized by the fact that the load surface is controlled automatically proportional with or in any functional dependency of the speed of the material web by means of a control system.

7. An apparatus according to claim 2 characterized by the fact that the endless conveyor for the rollers comprises chains extending over chain wheels.

8. An apparatus according to claim 1 characterized by the fact that the rollers are guided in guide rails 9. An apparatus according to claim 8 characterized by the fact that the rollers are connected with each other and that they are engaged at least at one end of the roller cover by a controllable displacement drive.

10. An apparatus according to claim 1 characterized by the fact that an articulated chain extending over a plane supporting surface and comprising sections of differential height which telescope into each other over a ramp is used as lifting and supporting member displaceable parallel with the web of material and guided over chain wheels.

* * * * *